United States Patent
Wang-Lee

[11] Patent Number: 5,638,147
[45] Date of Patent: Jun. 10, 1997

[54] EYEGLASS FRAME ASSEMBLY WITH ANGLE-ADJUSTABLE TEMPLES

[76] Inventor: Min-Young Wang-Lee, No. 473, Jong-Shan S. Rd., Yung-Kang Rd., Tainan Hsien, Taiwan

[21] Appl. No.: 690,839

[22] Filed: Aug. 1, 1996

[51] Int. Cl.⁶ .................. G02C 5/14; G02C 5/00
[52] U.S. Cl. .......................... 351/120; 351/140
[58] Field of Search .................. 351/120, 140, 351/41, 110, 111, 116, 118, 119, 153

[56] References Cited

U.S. PATENT DOCUMENTS 5,357,292  10/1994  Wiedner .................. 351/120
5,565,937  10/1996  Lee ........................ 351/120

*Primary Examiner*—Hung X. Dang
*Attorney, Agent, or Firm*—Harness, Dickey & Pierce, P.L.C.

[57] ABSTRACT

An eyeglass frame assembly includes a lens unit having two rearwardly extending side portions, each of which has a pivot hole with a guide portion, a positioning portion, and a constricted portion, a pair of bows, two connectors and two first pivot members for connecting the bows to the side portions. Each connector has a rear end pivoted to each bow about a vertical axis, and a front end with a slot to be aligned with the pivot hole. Each first pivot member horizontally passes through the aligned slot and the pivot hole and has a head portion, a first neck portion received in the slot, a second neck portion received in the pivot hole, and a stop member projecting outwardly of the pivot hole. A slit extends axially from the stop member to the first neck portion. The first pivot member is resilient transversely of the axis of the first pivot member. The stop member is pressed to thread through the guide portion. The second neck portion is forced through the constricted portion and is snapped by the positioning portion.

3 Claims, 5 Drawing Sheets

5,638,147

EYEGLASS FRAME ASSEMBLY WITH ANGLE-ADJUSTABLE TEMPLES

BACKGROUND OF THE INVENTION

1. Field of the Invention

This invention relates to an eyeglass frame assembly, more particularly to one which has a lens unit coupled with a pair of bows that are turnable upward and downward relative to the lens unit.

2. Description of the Related Art

Referring to FIG. 1, a conventional pair of eyeglasses includes a lens frame 1 carrying a pair of lenses 11, a pair of bows 2 and two connectors 3. The lens frame 1 has two side portions, each of which is provided with an oblong hole 12 therethrough. Each of the connectors 3 has a head portion 30 with a dimension that is greater than that of the oblong hole 12, and an engaging portion 31 made of plastic material and formed adjacent to the head portion 30. The engaging portion 31 forms a butt projection 311 in order to retain the engaging portion 31 in the hole 12 after the engaging portion 31 is passed through the oblong hole 12. The distal end of the engaging portion 31 has a vertical through-hole 310 formed therethrough. Each of the bows 2 has an ear piece 20 formed at the rear distal end thereof and a pivot portion 21 formed at the front distal end thereof. The pivot portion 21 of each bow 2 has two threaded holes 211 and a bolt 22 which extends through the threaded holes 211 of the pivot portion 21 and the through-hole 310, thereby mounting pivotally the bows 2 on the lens frame 1.

The drawback of the conventional eyeglasses is that the bow 2 is not adjustable upward and downward relative to the lens frame 1 so as to suit the needs of the wearer. In addition, since the connectors 3 are connected to the lens frame 1 by screws, a tool is needed for assembling the eyeglasses. Moreover, the bows 2 are liable to become loose as a result of the loosened screws.

SUMMARY OF THE INVENTION

Therefore, an objective of the present invention is to provide an eyeglass frame assembly which has a pivot connection using a non-screw fastener and in which a pair of bows are turnable and adjustable upward or downward relative to the lens unit.

Another object of the present invention is to provide an eyeglass frame assembly with a pivot connection which comprises non-screw fasteners and which facilitates assembly of the non-screw fasteners, the eyeglass frame and the bows.

According to this invention, the eyeglass frame assembly includes a lens unit having two rearwardly extending side portions, each of which has a pivot hole with a guide portion, a positioning portion, and a constricted portion between the guide portion and the positioning portion; a pair of bows with front ends to be connected to the rearwardly extending side portions, respectively; and means for connecting the bows to the rearwardly extending side portions, respectively. The connecting means includes two connectors and two first pivot members. Each connector has a rear end which is pivoted to one of the front ends of the bows about a vertical axis, and a front end which has a slot to be aligned with the pivot hole. Each first pivot member horizontally passes through the aligned slot and the pivot hole. Each first pivot member has a head portion, a first neck portion extending axially from the head portion and to be received in the slot, a second neck portion extending axially from the first neck portion and to be received in the pivot hole, and a stop member axially extending from the second neck portion so as to project outwardly of the pivot hole. Each of first pivot member further has a slit which extends axially from the stop member to the first neck portion. The first pivot member is resilient transversely of the axis of the first pivot member. The stop member is pressed to thread through the guide portion. The second neck portion is forced through the constricted portion and is snapped by the positioning portion.

BRIEF DESCRIPTION OF THIS DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 1:
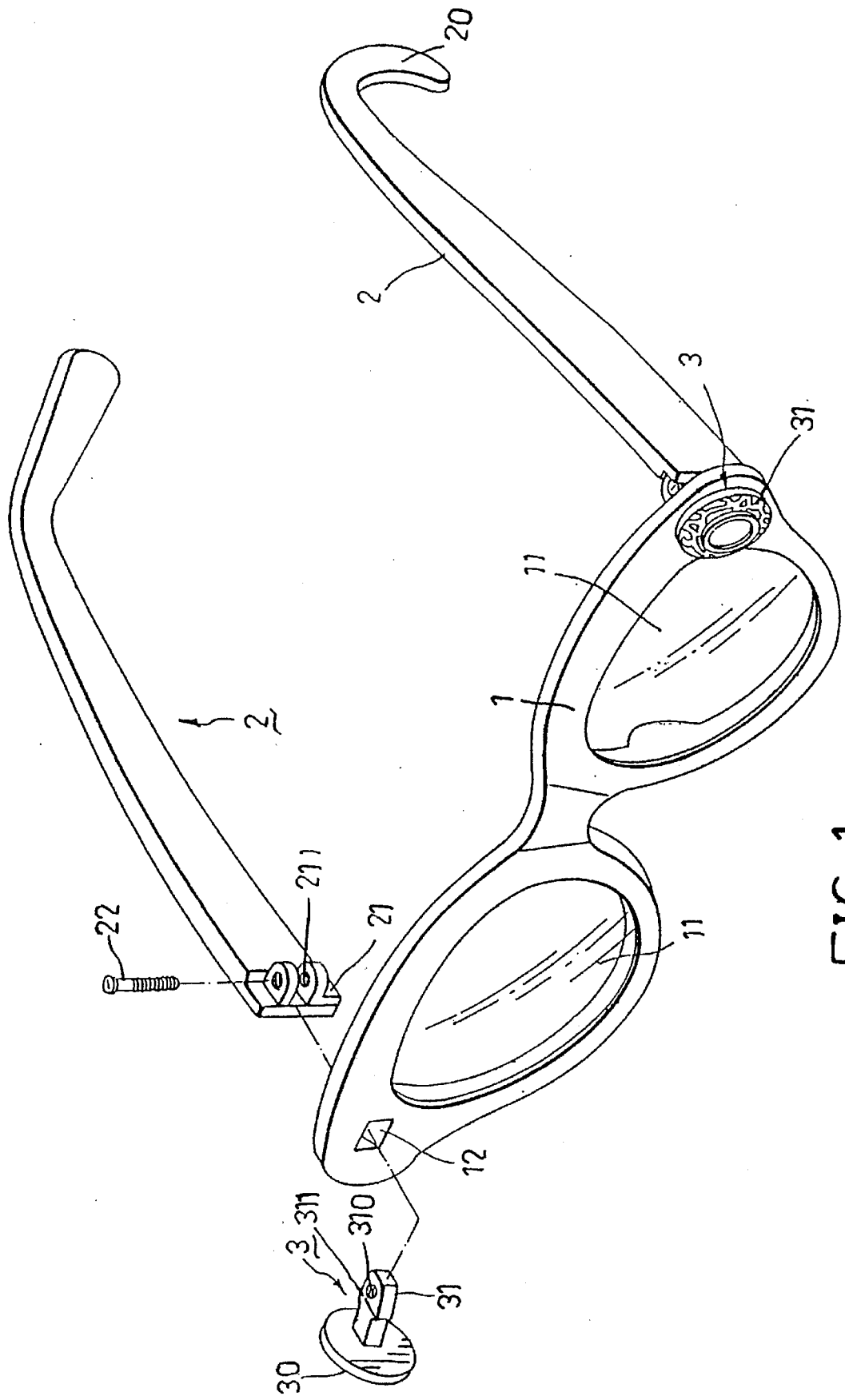
FIG. 1 is an exploded view of a conventional pair of eyeglasses.
Figure 2:
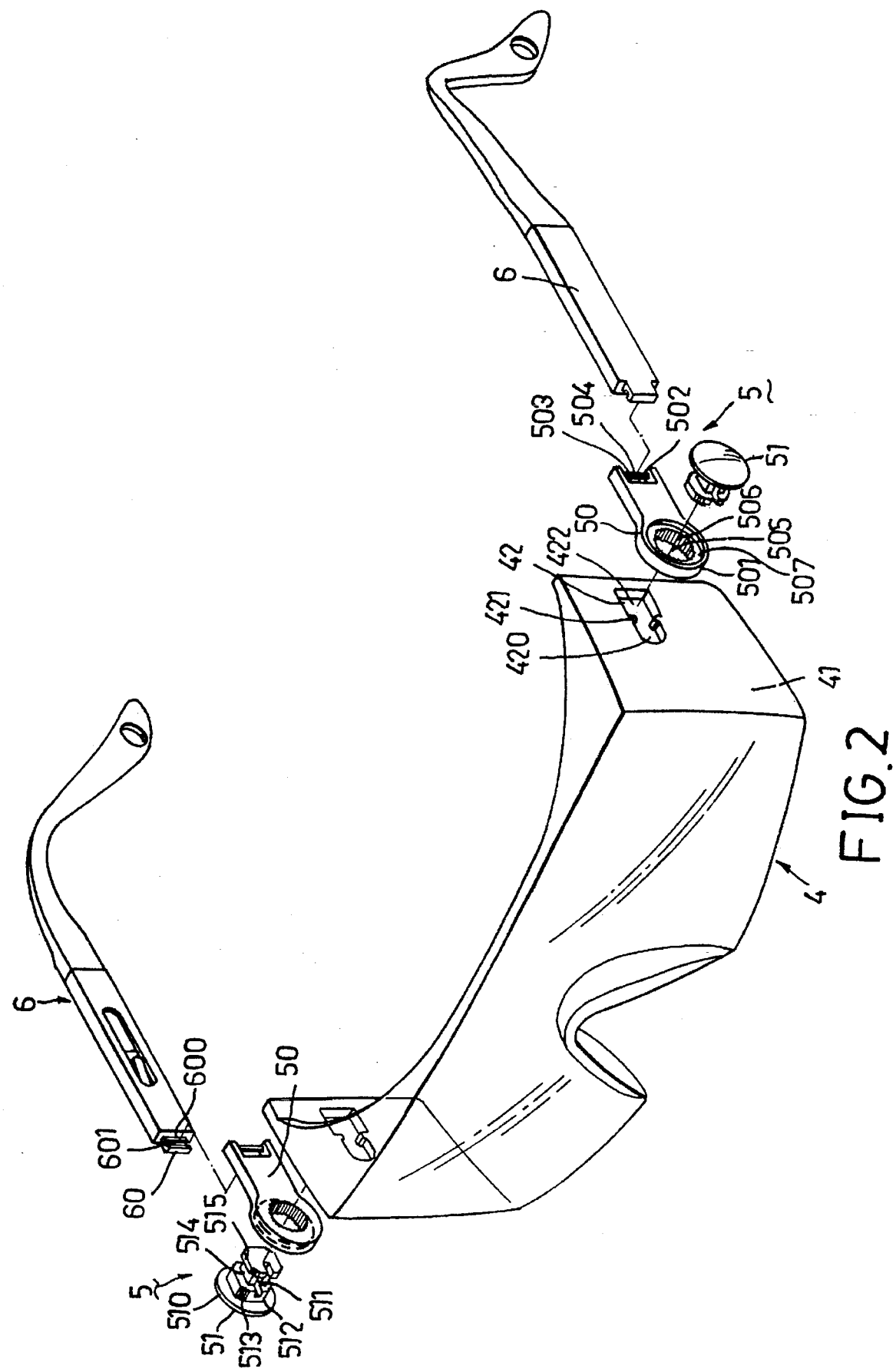
FIG. 2 is an exploded view of a preferred embodiment of a pair of eyeglasses according to the present invention.
Figure 3:
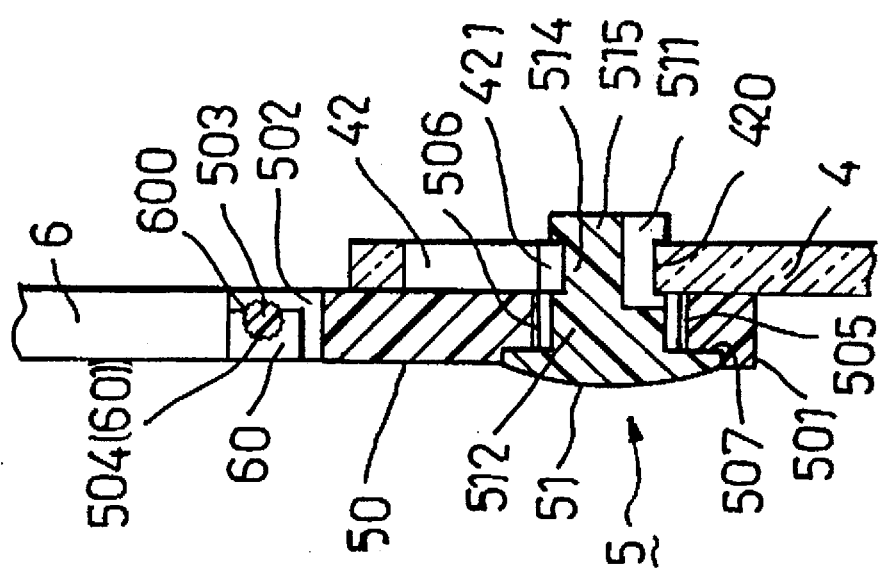
FIG. 3 is a fragmentary sectional view illustrating how a connector is connected to the lens unit and the bow of the eyeglasses according to the present invention.

Referring to FIGS. 2 and 3, the preferred embodiment of the eyeglass frame assembly of this invention includes a lens unit 4, connecting means 5, and a pair of bows 6.

The lens unit 4, which can be a lens or a lens frame, has two rearwardly extending side portions 41 at the opposite ends. Each rearwardly extending side portion 41 has a pivot hole 42 with a guide portion 422, a positioning portion 420, and a constricted portion 421 between the guide portion 422 and the positioning portion 420.

The connecting means 5 includes a pair of connectors 50 and a pair of first pivot members 51. Each of the connectors 50 has a front end 501 which has a slot 505 to be aligned with the pivot hole 42 of the respective rearwardly extending side portion 41, and an annular groove 507. The first pivot members 51 pass through the aligned slots 505 and the pivot holes 42, respectively. Each of the first pivot members 51 has a head portion 510 to be received in the annular groove 507 of the connector 50, a first neck portion 512 which extends axially from the head portion 510 so as to be received in the slot 505, a second neck portion 514 which extends axially from the first neck portion 512 so as to be received in the pivot hole 42, and a stop member 515 which extends axially from the second neck portion 514 so as to project outwardly of the pivot hole 42. Each of the guide portions 422 permits the respective first neck portion 512 and stop member 515 to thread therethrough. The first neck portion 514 of each first pivot member 51 is received by the respective positioning portion 420 after passing through the respective constricted portion 421. Each of the slots 505 is circular and is provided with internal gear teeth 506. Each of the first neck portions 512 is substantially rectangular and has rounded edges, each of which is formed with axial teeth 513 for engagement with the internal gear teeth 506 of the corresponding slot 505. Each of the connectors 5 is forked at the rear end 502 which is provided with a second pivot member 503. In this embodiment, each of the second pivot member 503 is a vertically extending pivot shaft with a plurality of vertical teeth 504.

The bows 6 have front ends 60 to be connected to the rearwardly extending side portions 41, respectively. Each of the front ends 60 has a vertically extending slot 600 with a plurality of vertical teeth 601 for engagement with the vertical teeth 504 of the corresponding one of the second pivot members 503 so as to connect pivotally with the respective one of the connectors 5.

In addition, each of the first pivot members 51 has a slit 511 which extends axially from the stop member 515 to the first neck portion 514. Thus, the stop member 515 is pressed to be slightly contractible so that it can easily pass through the pivot hole 42. The first neck portion 512 is slightly contractible so that the axial teeth 513 resiliently engage the gear teeth 506. Thus, the first neck portion 512 can be turned clockwise or counterclockwise relative to the connector 50 for adjustment of the angle of the bow 6. The second neck portion 514 is also forced to be slightly contractible so as to pass through the constricted portion 421 and to be snapped by the positioning portion 420. Therefore, the first pivot member 51 is resilient transversely of the axis of the first pivot member 51.

Figure 4:
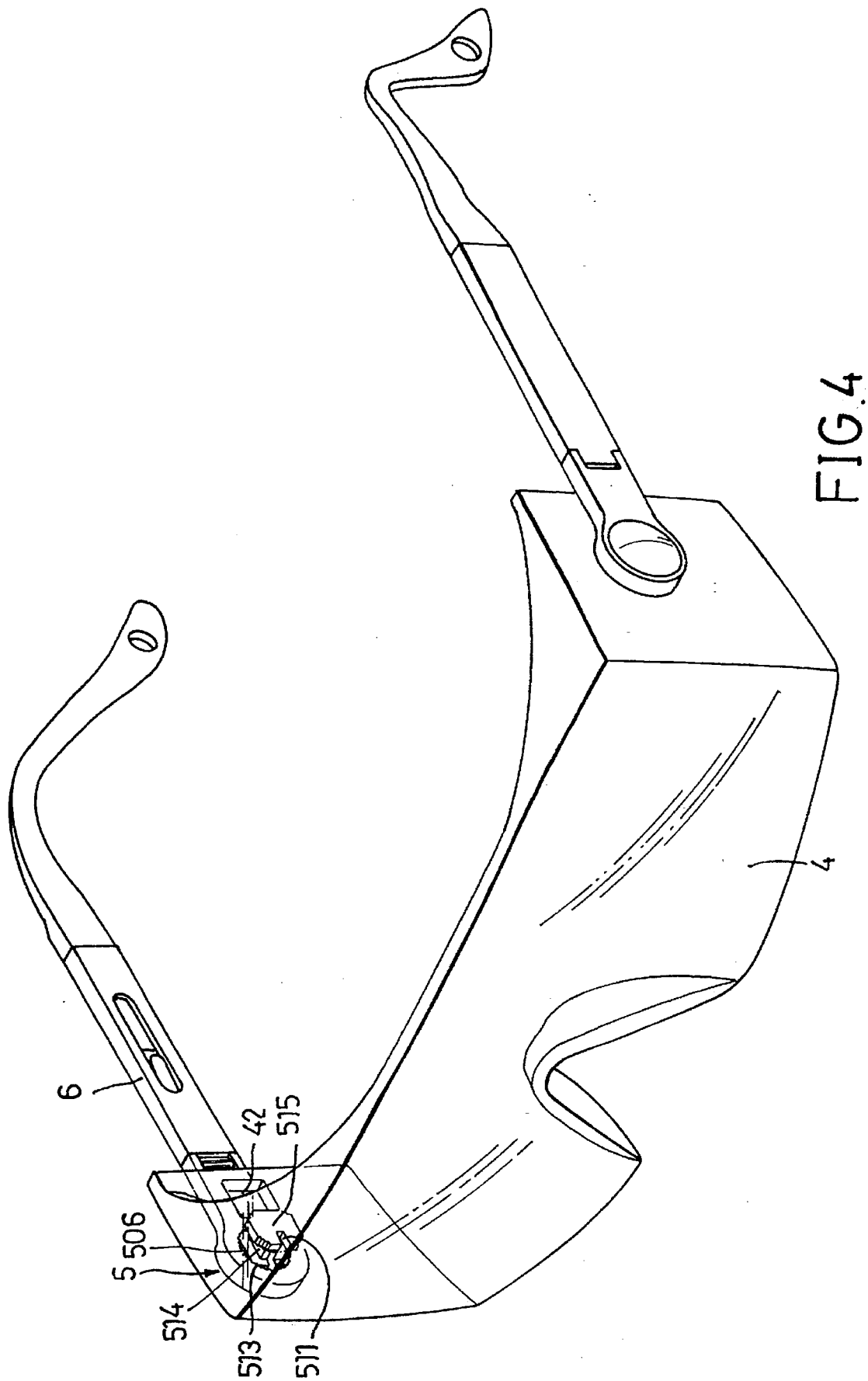
FIG. 4 is a perspective view of a pair of eyeglasses according to the present invention.
Figure 5:
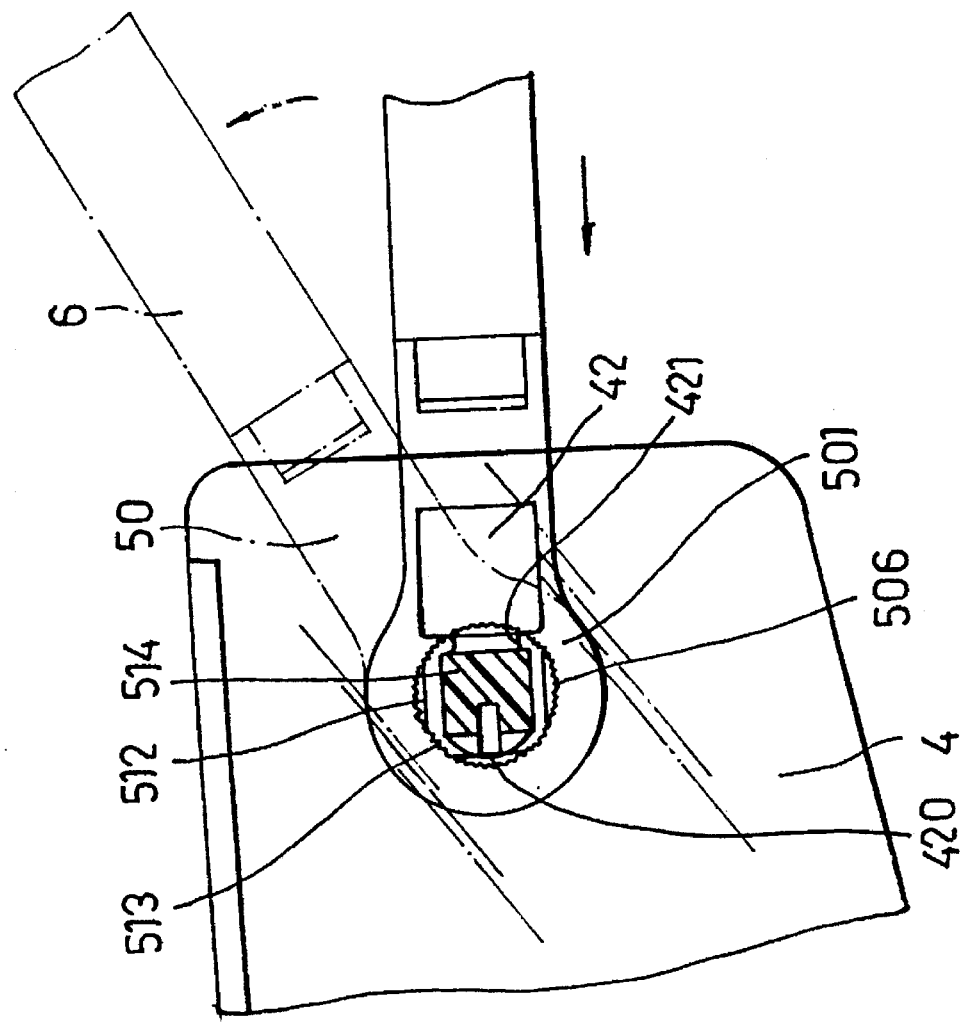
FIG. 5 is a schematic view illustrating how a bow is turned about a connector.

Referring to FIGS. 3 and 4, in assembly, the connecting means 5 can be connected to the bows 6 and then to the lens unit 4, or to the lens unit 4 and then to the bows 6. The bows 6 can be rotated horizontally about the second pivot members 503 at the rear ends 502 of the connectors 50, respectively. As shown in FIG. 5, each of the bows 6 can also be turned vertically about the first pivot member 51 at the front end 501 of the respective connector 50 so as to be adjustable upward or downward relative to the lens unit 4 for suiting the needs of the wearer.

As compared to the conventional eyeglass frame assembly that use screw fasteners, the pivot members 51 simplify the task of pivoting the connectors 50 to the lens unit 4 because the pivot members 51 can be attached to the lens unit 4 and the connector 5 by press fitting without using any tool.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. An eyeglass frame assembly comprising:

a lens unit having two rearwardly extending side portions, each of said rearwardly extending side portions having a pivot hole with a guide portion, a positioning portion, and a constricted portion between said guide portion and said positioning portion;

a pair of bows having front ends to be connected to said rearwardly extending side portions respectively; and means for connecting said bows to said rearwardly extending side portions respectively, said connecting means including two connectors and two first pivot members, each of said connectors having a rear end pivoted to one of said front ends about a vertical axis, and a front end which has a slot to be aligned with said pivot hole, each of said first pivot members horizontally passing through said aligned slot and said pivot hole, each of said first pivot members having a head portion, a first neck portion extending axially from said head portion and to be received in said slot, a second neck portion extending axially from said first neck portion and to be received in said pivot hole, and a stop member extending axially from said second neck portion so as to project outwardly of said pivot hole;

each of said first pivot members further having a slit which extends axially from said stop member to said first neck portion, said first pivot member being resilient transversely of the axis of said first pivot member, said stop member being pressed to thread through said guide portion, said second neck portion being forced through said constricted portion and snapped by said positioning portion.

2. An eyeglass frame assembly as claimed in claim 1, wherein said slot is circular and is provided with internal gear teeth, said first neck portion being substantially rectangular and having rounded edges, each of which is formed with axial teeth to engage said internal gear teeth.

3. An eyeglass frame assembly as claimed in claim 2, wherein each of said connectors is forked at said rear end and has a second pivot member vertically mounted to said rear end so as to connect pivotally with the respective one of said bows.

* * * * *